Dec. 17, 1929.  F. VASCONCELLOS  1,740,321
CHOPPER AND CULTIVATOR
Filed Dec. 28, 1927   2 Sheets-Sheet 1
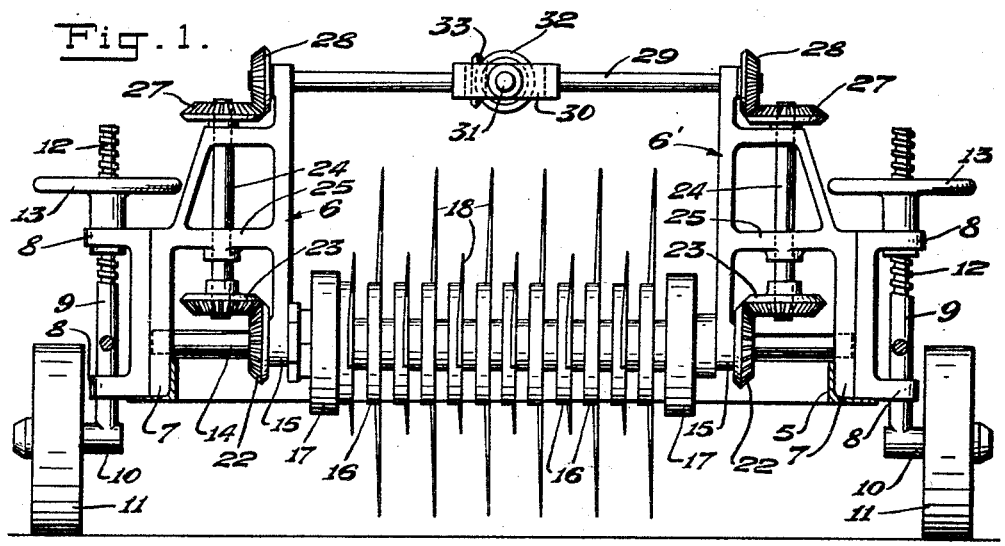
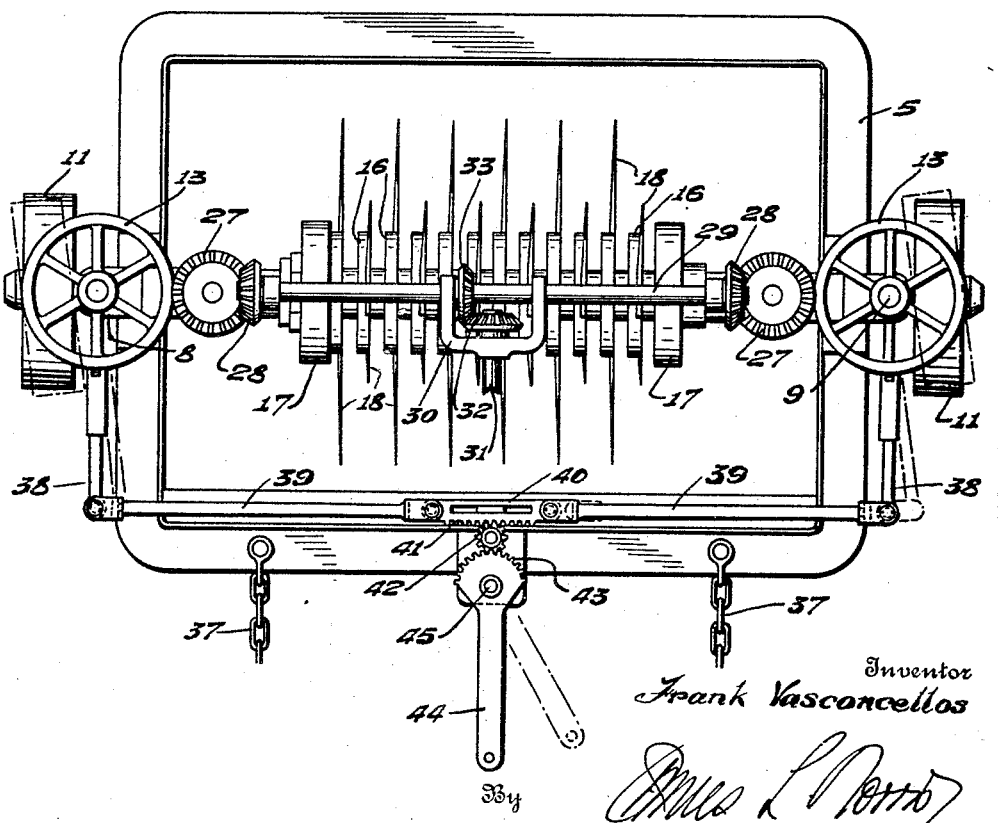
Inventor
Frank Vasconcellos
By
Attorney

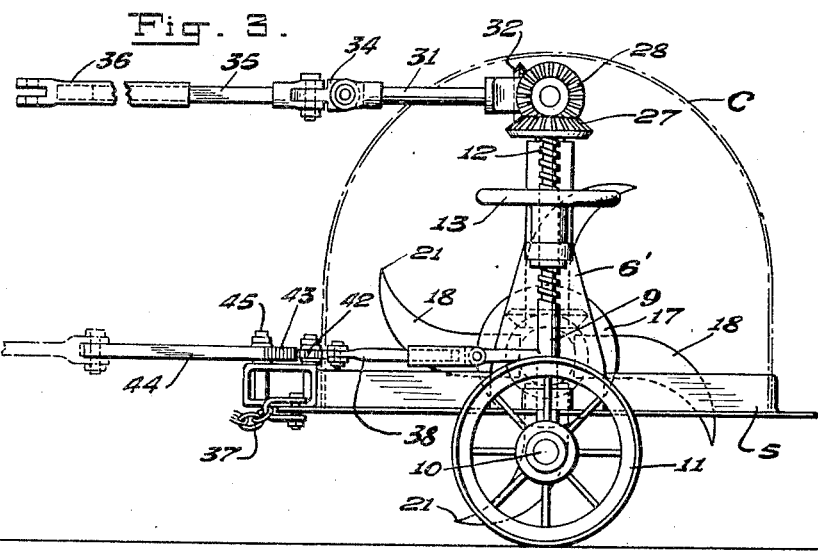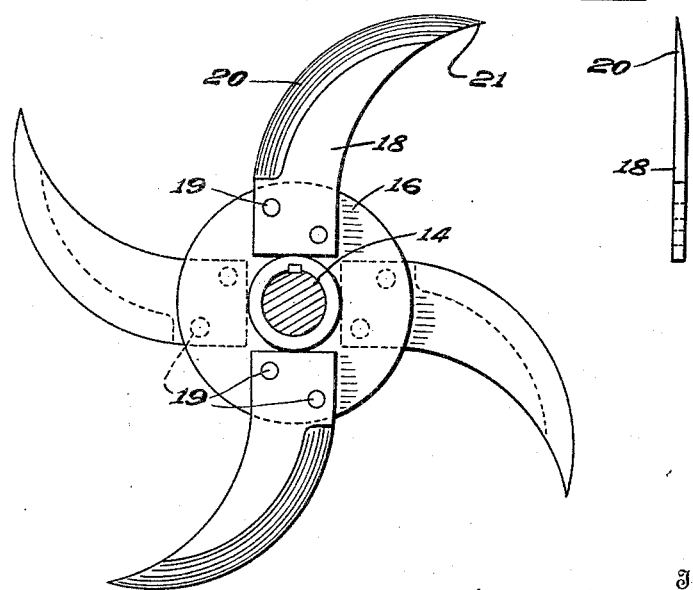

Patented Dec. 17, 1929

1,740,321

UNITED STATES PATENT OFFICE

FRANK VASCONCELLOS, OF PAIA, MAUI, TERRITORY OF HAWAII

CHOPPER AND CULTIVATOR

Application filed December 28, 1927. Serial No. 243,185.

This invention relates to improvements in green manure choppers and cultivators, one object of the invention being the provision of a machine of this type which is especially adapted for cutting and shredding pineapple plants and spreading the same upon the ground, the soil being later thrown thereover so that the soil may be benefited by the humus produced from the decaying vegetation, and thus put back into the ground the material which during the growth of the plants is taken therefrom.

Another object of this invention is the provision of a machine of this type which is adapted to be used as a trailer for a tractor and in which the cutting and earth plowing or agitating members are operated independently of the wheeled support and directly from the engine of the tractor, so that the speed thereof may be increased or diminished regardless of the speed at which the device is moved over the surface being acted upon and also so that the cutting action will be downwardly and rearwardly, as it has been found in practice that the cutting member must be rotated at what might be termed an excessive speed to properly comminute or chop up the fibers of the plants so that the same may be more easily covered with the loose soil and, therefore, in such fine state as to facilitate in the decaying of such fibers in the shortest possible time.

Another object of this invention is the provision of dirigible supporting wheels for a trailer which are connected in such a manner with the drawbar of the tractor that the same will be supported and guided due to the direction of movement of the tractor so that the present device can be turned in the shortest possible distance, thus rendering it possible to cultivate or act upon the surface without undue loss at the ends of the row, as is the case with many trailing machines.

In the accompanying drawings:—

Figure 1 is a front elevation, partly in section, of the complete machine, the frame being cut away to show the arrangement of the cutter or knife-carrying shaft;

Figure 2 is a top plan view of the complete machine;

Figure 3 is a side elevation of the complete machine with the cover shown in dotted lines;

Figure 4 is an enlarged detail view of the cutter shaft with the blades attached thereto; and Figure 5 is a detailed edge view of one of the blades.

Referring to the drawings, the numeral 5 designates a rectangular open frame which constitutes the main support for the present machine. Supported at opposite sides in the shorter ends of the frame and projecting upwardly therefrom are the two standards 6 and 6' each one of which is identical in construction but arranged in an opposite direction, and provided each with a depending portion 7, the lower end of which is connected to the frame 5 and is provided with two vertically aligned brackets or projections 8 in which is supported its respective vertical shaft 9 which, in turn, carries the stub shaft 10 and the dirigible or steering and supporting wheel 11, there being two of these to the complete machine. In order to adjust the frame 5 and the various elements supported thereby vertically and relatively to the surface traversed, there is provided the threaded portion 12 upon the vertical shaft 9 and the adjusting wheel 13, the operation of the wheel 13 either retracting or projecting the shaft 9 within its respective bearings or supports 8 and thus permitting the mechanism to be raised or lowered relatively to the ground.

The main shaft 14 of the present mechanism is supported in the respective portions 7 and 15 of the vertical members 6 and 6', the same being rotatable freely therein and supported in anti-frictional bearings (not shown), so that this shaft will rotate freely and with the least possible friction, as it is what may be termed in a machine of this character a high speed shaft. Disposed in spaced relation upon the shaft 14 between the vertical standards 6 and 6' are a plurality of spaced disks or hubs 16 and at the ends the enlarged disks 17 which are in the nature of two balance wheels or momentum devices to assist in the even rotation of the shaft 14.

As shown in Figure 3, to each disk 16 is attached four blades 18 by means of fastening devices 19, bolts or the like, so that the blades may be removed at will for replacement or sharpening, the cutting edge 20 of the blade being on the outer curved edge and terminating in the sharp point 21, the blade thus being in plan view more or less of a machete. The shaft 14 is rotated so that the blades move in the direction of the arrow, as shown in Figure 4, so that they cut downwardly and rearwardly, thus ripping the plants from the top downwardly and engaging the ground to push the plants beneath, and as the blades are closely placed in regard to the size of the machine, the plants are, in reality, shredded, it being desirable to adjust the frame 5, so that the blades project the desired distance in the soil and in accordance with the nature of the soil.

In order to rotate the shaft 14 and at the same time place no undue strain or torsion upon the same, I employ two gears 22 disposed as illustrated in Figure 1 and each gear in mesh with its drive gear 23, there being two of these gears and two shafts 24 which are vertically disposed and journaled in the cross-members 25 of the vertical frame 6, 6', respectively. Upon the upper end of each shaft 24 is disposed a pinion 27 which meshes, respectively, with its driving pinion 28 mounted upon the respective ends of the drive shaft 29. This shaft, as shown, is journaled in the upper ends of the vertical frame 6, 6' and is in parallel alinement with the blade-carrying shaft 14, while in order to drive this shaft there is mounted thereon a pinion 33 which is driven from the pinion 32 carried by the shaft 31 journaled in the U-shaped frame 30 which holds the gears relatively to each other and in operative relation at all times. The shaft 31, as illustrated in Figure 3, is projected upwardly and is provided with a universal joint 34 carrying the short shaft 35 telescopically fitting the forward shaft 36 which forms the connection for directly connecting with the engine shaft (not shown) the tractor. Thus, it will be seen that the tractor engine speeded at the proper speed will rotate through this driving mechanism the blade or cutter-carrying shaft 14, it having been found in practice that this shaft should be rotated at approximately 650 R. P. M. in order to accomplish the result desired in the shredding of pineapple plants and for which this machine has been especially designed, although it is to be understood that it can be operated upon any other growth which it is desired to use as a cover crop to furnish humus for the soil.

In order to properly connect the present trailer to the tractor so that it will be drawn thereby, there are provided two guide chains 37 connecting the frame to the desired portion of the tractor, while in order to steer the wheels so that they will follow the tractor in this movement across the field and at the turns, each shaft 9 is provided with a forwardly extending rod 38, the forward end of which is pivotally connected to the two inwardly disposed operating rods 39, these rods, in turn, being connected to the sliding frame 40 carrying the rack teeth 41, a gear 42 being in mesh with the rack and with the toothed segment 43 of the drawbar 44. This drawbar is pivoted at 45 and is adapted to be connected to the drawbar of the tractor (not shown.) It will thus be seen that as the drawbar 44 is moved in either direction to one side or the other, the wheels 11 will be steered accordingly, the wheels assuming the angular position of the drawbar 44 and thus properly following the tractor in its draft direction.

From the foregoing description, taken in connection with the drawings, it is evident that with a device constructed according to and embodying this invention, a green manure chopper of a type especially adapted for use upon pineapple plants has been designed and one which is readily attached to or detached from a tractor and which is adjustable for different characters or types of soil and for operation upon the plants, so that the plants including the leaves and the stalks are properly comminuted or shredded and finally mulched into the soil by the action of the cutter or blades.

Where desired, a cover C is placed over the mechanism so that any of the trash that tends to be lifted by the blades may be directed back upon the ground.

Although in Figs. 1 and 2, I have shown the hubs 16 as having only two knives or blades, it is apparent that any number, as, for instance, four, as shown in Fig. 4, can be employed.

In practice, I have found that this machine can be attached to a Best 30 tractor for work specially in cutting down weeds in orchards and groves; and that after the sugar cane harvest and the ground has been plowed, this machine will break up the lumps containing the stools and roots of the cane and pulverize the earth.

It is also intended to use proper lubricating means for carrying oil to the moving parts of this machine to insure proper operation and longer life to the machine.

I claim:—

An apparatus of the character described, comprising a frame including a pair of side members and an end member, a standard extending upwardly from each of said side members approximately midway between the ends of the latter, each of said standards comprising an outer vertical member having its lower end connected to a side member of said frame and an inner vertical member spaced from said outer member inwardly of the frame, a transverse member connecting said vertical members between their upper and lower ends, a second transverse member connecting the inner vertical member below its upper end to the outer vertical member, a pair of vertically aligned spaced ears extending laterally from said outer vertical member, a blade-carrying shaft extending transversely of said frame and journaled in the inner vertical members of said standards below said first-named transverse members, a bevel gear keyed to said shaft adjacent each end thereof and bearing against the outer side of one of said inner vertical members, a drive shaft journalled in the inner vertical members above said second-named transverse member, a bevel gear keyed to said drive shaft adjacent each end of the latter and bearing against the outer side of one of said inner vertical members, a vertical shaft journalled in the transverse members of each of said standards, a bevel gear keyed to each end of each of said vertical shafts and meshing, respectively, with the bevel gears of said blade-carrying and driving shafts, a spindle journalled in the lateral ears of each of said outer vertical members, and a wheel-carrying stub shaft carried by each of said spindles.

In testimony whereof I have hereunto set my hand.

FRANK VASCONCELLOS.